(12) United States Patent
Hao

(10) Patent No.: US 9,151,005 B1
(45) Date of Patent: Oct. 6, 2015

(54) DISPOSABLE PET WIPE AND WASTE COLLECTION BAG

(71) Applicant: Phinarak Hao Indsutries Inc., Jacksonville, FL (US)

(72) Inventor: Phinarak Hao, Jacksonville, FL (US)

(73) Assignee: Phinarak Hao Industries, Inc., Jacksonville, FL (US)

( * ) Notice: Subject to any disclaimer, the term of this patent is extended or adjusted under 35 U.S.C. 154(b) by 0 days.

(21) Appl. No.: 14/503,718

(22) Filed: Oct. 1, 2014

(51) Int. Cl.
| | |
|---|---|
| A01K 29/00 | (2006.01) |
| E01H 1/12 | (2006.01) |
| A01K 13/00 | (2006.01) |
| A41D 19/00 | (2006.01) |

(52) U.S. Cl.
CPC ............. *E01H 1/1206* (2013.01); *A01K 13/001* (2013.01); *A41D 19/0075* (2013.01); *E01H 2001/124* (2013.01)

(58) Field of Classification Search
CPC ............ E01H 1/1206; E01H 2001/124; E01H 2001/128; A01K 13/001; A41D 19/0075
USPC ........................................ 294/1.3, 25; 15/227
See application file for complete search history.

(56) References Cited

U.S. PATENT DOCUMENTS

| | | | | |
|---|---|---|---|---|
| 4,788,733 | A * | 12/1988 | Lerner ....................... | 15/104.94 |
| 4,902,283 | A * | 2/1990 | Rojko et al. .................. | 604/290 |
| 4,959,881 | A * | 10/1990 | Murray ...................... | 15/227 |
| 5,301,806 | A * | 4/1994 | Olson ........................... | 206/278 |
| 5,961,167 | A * | 10/1999 | Gilley ......................... | 294/1.3 |
| 5,987,645 | A * | 11/1999 | Teaster ........................ | 2/159 |
| 6,481,766 | B1 * | 11/2002 | May et al. ..................... | 294/1.3 |
| 6,511,111 | B2 * | 1/2003 | Dooley ......................... | 294/1.3 |
| 6,637,035 | B1 * | 10/2003 | Brinkmann et al. ........... | 2/161.6 |
| 2008/0174128 | A1 * | 7/2008 | Jezzi ............................. | 294/1.3 |
| 2010/0037828 | A1 | 2/2010 | Loizides | |
| 2012/0216329 | A1 * | 8/2012 | Dennis ............................ | 2/158 |

* cited by examiner

*Primary Examiner* — Dean Kramer
(74) *Attorney, Agent, or Firm* — Kincart & Higham Intellectual Property Law, PA; Joseph P. Kincart; Camille A. Higham

(57) ABSTRACT

The present disclosure relates to improved convenience in helping to improve environmental and animal health and comfort. The present disclosure relates to disposable pet wipe and waste collection bags, series of disposable pet wipe and waste collection bags, and the manufacture thereof. More specifically, the present disclosure presents a disposable reversible receptacle for picking up and disposing pet waste, wherein the disposable reversible bag further comprises a moistened wipe, which may allow a user to sanitarily wipe the pet and pick up the waste.

15 Claims, 4 Drawing Sheets

DISPOSABLE PET WIPE AND WASTE COLLECTION BAG

Dogs are great companions and for many of us, they share our same living, work, and travel spaces, such as our neighborhoods, cars, and homes. Dogs do not instinctively wipe their paws or rear ends. Unfortunately, they can bring into our homes unwanted fecal material and other soiled material. Residual fecal material on a dog's rear end can be irritating to a dog and can bring in unsanitary things into our shared spaces. It is not uncommon to see a dog rubbing their rear ends on the carpets in our homes or track unwanted things into our homes from their soiled paws.

Because many pet owners share the same living spaces with their pets, it may interest them to take responsibility for cleaning after their pets immediately after they have walked or defecated to prevent the potential spread of this mess throughout their homes.

BACKGROUND OF THE DISCLOSURE

1. Field of the Disclosure

The present disclosure relates to disposable pet wipe and waste collection bags and the manufacture thereof. More specifically, the present disclosure presents a bag for picking up and disposing pet waste, wherein the bag further comprises a wiping portion, which may allow a user to sanitarily wipe the pet and pick up the waste.

2. Discussion of Related Art

Currently, waste collection bags or even old grocery bags are the primary methods of picking up after a pet, and pet wipes may be separately available as an option for cleaning a pet.

Loizides (U.S. application Ser. No. 12/228,442 filed Aug. 13, 2008) relates to an "anti-bacterial wet wipe, reversible to plastic poop bag 10 [having] the design of a mitten/pouch 20 with a thumb insertion 24" may solve these issues. See para [0016]. In this application, "[t]he outside layer of the mitten/pouch 22, contains the anti-bacterial/sanitizing solution. The inner scented plastic layer 26 once reversed inside out will aid in eliminating odors of the animal waste . . . . The adhesive tape/strip component 40, will contain a strong adhesive compound to ensure that once the poop bag is turned inside out, that the animal waste collected will be adequately secured inside as to avoid any spill or seeping of animal waste collected." See para [0016].

SUMMARY OF THE DISCLOSURE

The related art fails to provide a convenient and practical solution to the issue of wiping and collecting waste of a pet. The pet wipes are sold separately but present sanitary issues for the pet owner, who, by product design, makes direct contact with the wet wipe. The direct contact between the pet owner hand and the wipes creates multiple issues. The pet owner may not have a convenient way to hold the wipe to be able to effectively control the wiping. This may cause the wipe to slip increasing the chances of contact with the pet waste.

The wipes are generally consistent material throughout so that the entire wipe is wet. With no moisture barrier, waste cleaned off the pet may seep into the wipe into contact with the pet owner. After use, pet wipes must be placed directly into a garbage can or into another bag, such as the waste collection bags. If used in conjunction with waste collection, the pet owner may be juggling an open bag holding pet waste, pulling out a wipe, wiping the pet, and placing the soiled wipe into the bag. This system is not convenient and presents sanitary issues at multiple points.

Though the mitt may offer a combination of waste collection and wiping, it presents a new set of issues both in the use and in the manufacturing of the mitt that are not described, disclosed, or suggested. The mitt disclosure does not describe, disclose, or suggest an embodiment practical for manufacturing, use, or storage. The Loizides application does not describe, disclose, or suggest that the exposed outside layer with sanitizing solution may leak onto other surfaces and/or dry out. The application does not describe, disclose, or suggest that inner scented plastic layer may cause the waste odor concealing scent to rub off onto the pet owner's hand. The application does not describe, disclose, or suggest that the mitt, adhesive tape, and exposed sanitizing solution may also create waste and inefficiencies for the manufacturing process.

Therefore, what is needed, is a convenient way to collect waste and utilize a wipe to clean the pet. Accordingly, the present disclosure relates to an improved collection and wipe system, which allows a pet owner to accomplish both tasks utilizing the same mechanism, which may not require direct contact with the wipe. Further needed is a practical solution that allows for efficient manufacturing and convenient storage. Accordingly, the present disclosure also relates to an improved method of manufacture, which may allow the disposable pet wipe and waste collection bag to be manufactured.

The present disclosure describes a disposable pet wipe and waste collection bag and methods of manufacture. The disposable pet wipe and waste collection bag combines the functions of waste collection and wiping into a single embodiment. The present disclosure may allow for ease of manufacturing and storage. In some aspects, the pet wipe and waste collection bag may allow a pet owner to maintain control of the wipe, which may limit concern about waste or moisture seeping through the bag. In some embodiments, the wipe may be stored in a protected state, wherein the moisture may be sealed in and the wipe may be protected from unintended contamination. In some embodiments, the present disclosure describes methods of manufacturing, wherein multiple disposable pet wipe and waste collection bags may be manufactured as a series, which may allow for cost-efficient manufacturing.

The present disclosure describes a disposable pet wipe and waste collection bag comprising a disposable reversible receptacle comprising an exterior comprising a pliable material of limited moisture permeability, wherein at least a portion of the pliable material comprises a moistened wipe, wherein the moistened wipe comprises an at least partially absorptive material moistened with a wipe solution; an interior configured to fit over a hand of a user, wherein the interior and the exterior share the pliable material; an unsealed end comprising an opening configured to accept the hand into the interior; and a sealed end distally located from the unsealed end.

In some embodiments, the disposable reversible receptacle may be stored in a reversed position, wherein the interior is located externally, and the exterior is located internally. In some aspects, the disposable reversible receptacle may be stored in a normal position, wherein the interior is located internally, and the exterior is located externally, and wherein the exterior further comprises a removable protective shield covering the moistened wipe.

The wipe solution may comprise an antibacterial solution. The pliable material may comprise a plastic. The pliable material may be manufactured from a tubular film. The at least partially absorptive material may comprise a spun lace nonwoven fabric. The at least partially absorptive material and the pliable material may comprise a biodegradable material. The exterior may further comprise a reactive agent capable of neutralizing and/or degrading pet waste.

The present disclosure describes a series of disposable pet wipe and waste collection bags comprising a plurality of disposable pet wipe waste collection bags, wherein the plurality of disposable pet wipe waste collection bags are detachably interconnected, each disposable pet wipe waste collection bag comprises: a disposable reversible receptacle comprising: an exterior comprising a pliable material of limited moisture permeability, wherein at least a portion of the pliable material comprises a moistened wipe, wherein the moistened wipe comprises an at least partially absorptive material moistened with a wipe solution; an interior configured to fit over a hand of a user, wherein the interior and the exterior share the pliable material; an unsealed end comprising an opening configured to accept the hand into the interior; and a sealed end distally located from the unsealed end.

In some aspects, the plurality of disposable pet wipe and waste collection bags may be detachably interconnected in a consecutive manner, wherein a sealed end of a first disposable pet wipe and waste collection bag is detachably connected to an unsealed end of a subsequent disposable pet wipe and waste collection bag, and wherein an unsealed end of the first disposable pet wipe and waste collection bag is detachably connected to a sealed end of a prior disposable pet wipe and waste collection bag. The plurality of disposable pet wipe and waste collection bags may be stored as a roll or stack.

In some embodiments, the disposable reversible receptacles may be stored in a normal position, wherein the interior is located internally, and the exterior is located externally, and wherein the exterior further comprises a removable protective shield covering the moistened wipe. In some aspects, the disposable reversible receptacles may be stored in a reversed position, wherein the interior is located externally, and the exterior is located internally. The series of disposable pet wipe and waste collection bags may be manufactured in the reversed position.

The pliable material may comprise a plastic. The pliable material of each disposable pet wipe and waste collection bag may be manufactured from a tubular film. The reversible receptacle of each disposable pet wipe and waste collection bag may comprise a plurality of plastic sheets connected by a sealing process.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

The present disclosure provides generally for disposable pet wipe and waste collection bags and the manufacture thereof.

In the following sections, detailed descriptions of examples and methods of the disclosure will be given. The description of both preferred and alternative examples though are exemplary only, and it is understood that to those skilled in the art that variations, modifications, and alterations may be apparent. It is therefore to be understood that the examples do not limit the broadness of the aspects of the underlying disclosure as defined by the claims.

GLOSSARY

Interior: as used herein refers to the portion of a reversible plastic receptacle that may be in contact with a user's hand during use of the disposable pet wipe and waste collection bag.

Exterior: as used herein refers to the portion of a reversible plastic receptacle that may be in contact with the pet or waste, in contrast to in contact with the user, during use of the disposable pet wipe and waste collection bag.

Reversed Position: as used herein refers to a flipped configuration wherein the interior may be located in an external position and the exterior may be located in an internal position. Reversed position may contrasted to a normal position.

Figure 1A:
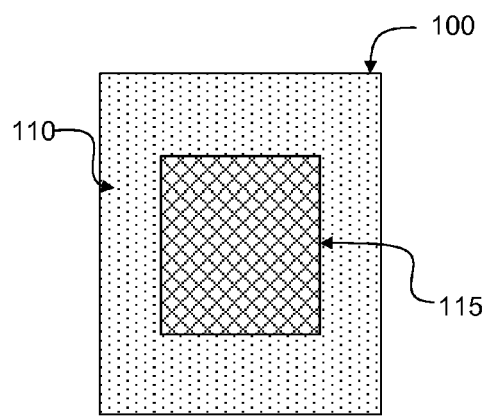
FIG. 1A illustrates an exemplary embodiment of a disposable pet wipe and waste collection bag.

Referring now to FIG. 1A, an exemplary embodiment of a disposable pet wipe and waste collection bag 100 is illustrated. In some embodiments, a disposable pet wipe and waste collection bag 100 may comprise a reversible receptacle 110 with a moistened wipe 115 adhered to the exterior of the reversible receptacle 110, wherein both the reversible receptacle 110 and the moistened wipe 115 may be disposable. In some aspects, the disposable pet wipe and waste collection bag may be stored in a reversed position prior to use, which may limit loss of moisture, such as evaporation of sanitizing solution. In some embodiments, the reversible receptacle 110 may comprise a textured interior, which may allow a user to control the disposable pet wipe and waste collection bag more easily.

The disposable pet wipe and waste collection bag 100 may be of sufficient length and size to capture large messes and allow for easy tying of the bag, which may ensure secure containment of any odor, liquid, or solid mess inside the bag. Where the disposable pet wipe and waste collection bag 100 may be stored in a reversed position, the moistened wipe 115 may be contained on the inside surface of the bags and can be adhered on one or both sides of the inside surface of the reversible receptacle 110. Mechanism to adhere the moistened wipe 115 to the reversible receptacle 110 may be physical or chemical, not limited to hot melt, pressure sensitive adhesives, tacks or grommets, suturing, adhesive tapes, or the like. In some embodiments, the moistened wipe 115 may be adhered to the reversible receptacle 110 through a heat sealing or thermoforming process.

Reversible receptacle 110 material may comprise, but not limited to, PVC, HDPE, LDPE, biodegradable materials, or similar pliable material with limited liquid, odor, moisture permeability. The material may be scented or unscented and may be variously colored, such as for aesthetic purposes. The moistened wipe 115 may be composed of but not limited to spun lace nonwoven comprising combinations of paper, polyester, viscose, cotton, etc. absorbable fabrics that may accept wipe solution. The moistened wipe 115 may comprise sufficient surface area, texture, and properties to allow a user to effectively wipe a pet. The moistened wipe 115 may be scented or unscented, as a moistened wipe 115 material may retain more scented liquid than scented plastics.

For example, moistened wipe 115 solution may comprise one or more of water, alcohol, bacteriocidal, germicidal, fungicidal components for to prevent microbial growth on stored wet wipes, glycerin, aloe Vera, Disodium Cocoamphodiacetate, mineral oil, or vitamin e. In some aspects, the wipe solution may be antibacterial. The wipe solution may cleanse, nourish, moisturize, and protect skin, and may further comprise surfactants and cleansing agents, which may reduce the amount of force required to effectively wipe the pet and may increase the comfort for the pet.

Figure 1B:
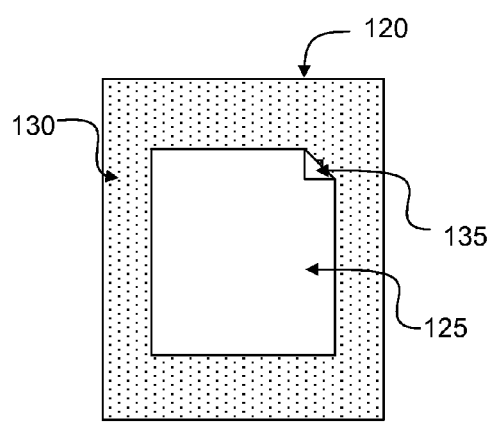
FIG. 1B illustrates an alternate exemplary embodiment of a disposable pet wipe and waste collection bag.

Referring now to FIG. 1B, an alternate exemplary embodiment of a disposable pet wipe and waste collection bag 120 is illustrated. In some embodiments, a seal layer 135 may protect a moistened wipe 125 from contamination or loss of moisture, for example. In some aspects, the seal layer 135 may comprise a removable protective shield, wherein the seal layer 135 may be peeled away from the reversible receptacle 130, wherein the peeling may expose the moistened wipe 125.

Figure 1C:
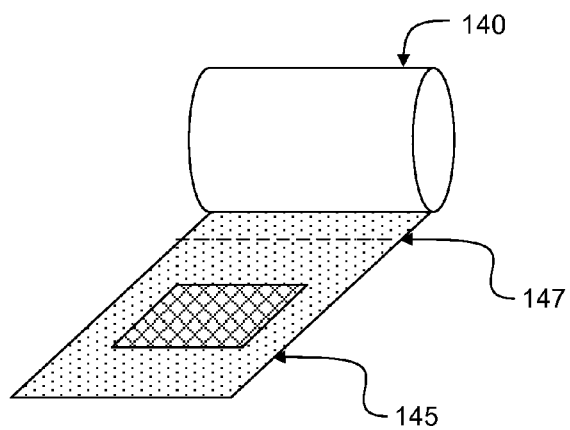
FIG. 1C illustrates an exemplary embodiment of a roll of disposable pet wipe and waste collection bags.

Referring now to FIG. 1C, an exemplary embodiment of a roll 140 of disposable pet wipe and waste collection bags 145 is illustrated. In some aspects, the roll 140 may comprise a series of connected disposable pet wipe and waste collection bag 145, wherein individual disposable pet wipe and waste collection bag 145 may be torn apart along perforations 147. In some aspects, the consecutive disposable pet wipe and waste collection bags 145 may be connected sealed end to unsealed end.

Alternatively, not shown, a roll 140 may comprise a series of disconnected disposable pet wipe and waste collection bag 145, wherein the disposable pet wipe and waste collection bag 145 may be layered or stacked, wherein individual disposable pet wipe and waste collection bag 145 may be removed, wherein the removal may not unwind the roll 140. In still further embodiments, multiple disposable pet wipe and waste collection bag 145 may layered and stored in a container, wherein a user may pull individual disposable pet wipe and waste collection bag 145 from the container, similarly to a box of facial tissues.

Figure 1D:
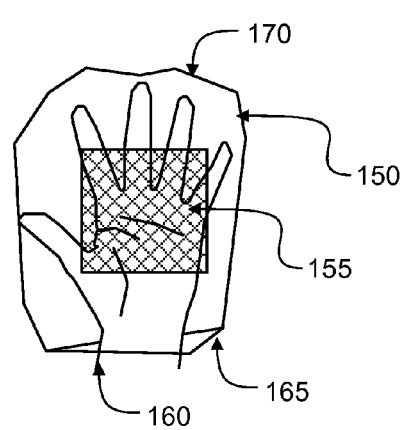
FIG. 1D illustrates an exemplary embodiment of a disposable pet wipe and waste collection bag worn by a user.

Referring now to FIG. 1D, an exemplary embodiment of a disposable pet wipe and waste collection bag 150 worn by a user. In some embodiments, the disposable pet wipe and waste collection bag 150 may comprise a sealed end 170 and an unsealed end 165, wherein a user may separate the unsealed end 165 and access the interior of the disposable pet wipe and waste collection bag 150. In some aspects, a user may place her hand 160 in the interior of the disposable pet wipe and waste collection bag 150, wherein the moistened wipe 155 may be located over her hand, allowing the user to control the wiping and waste collection.

Figure 2:
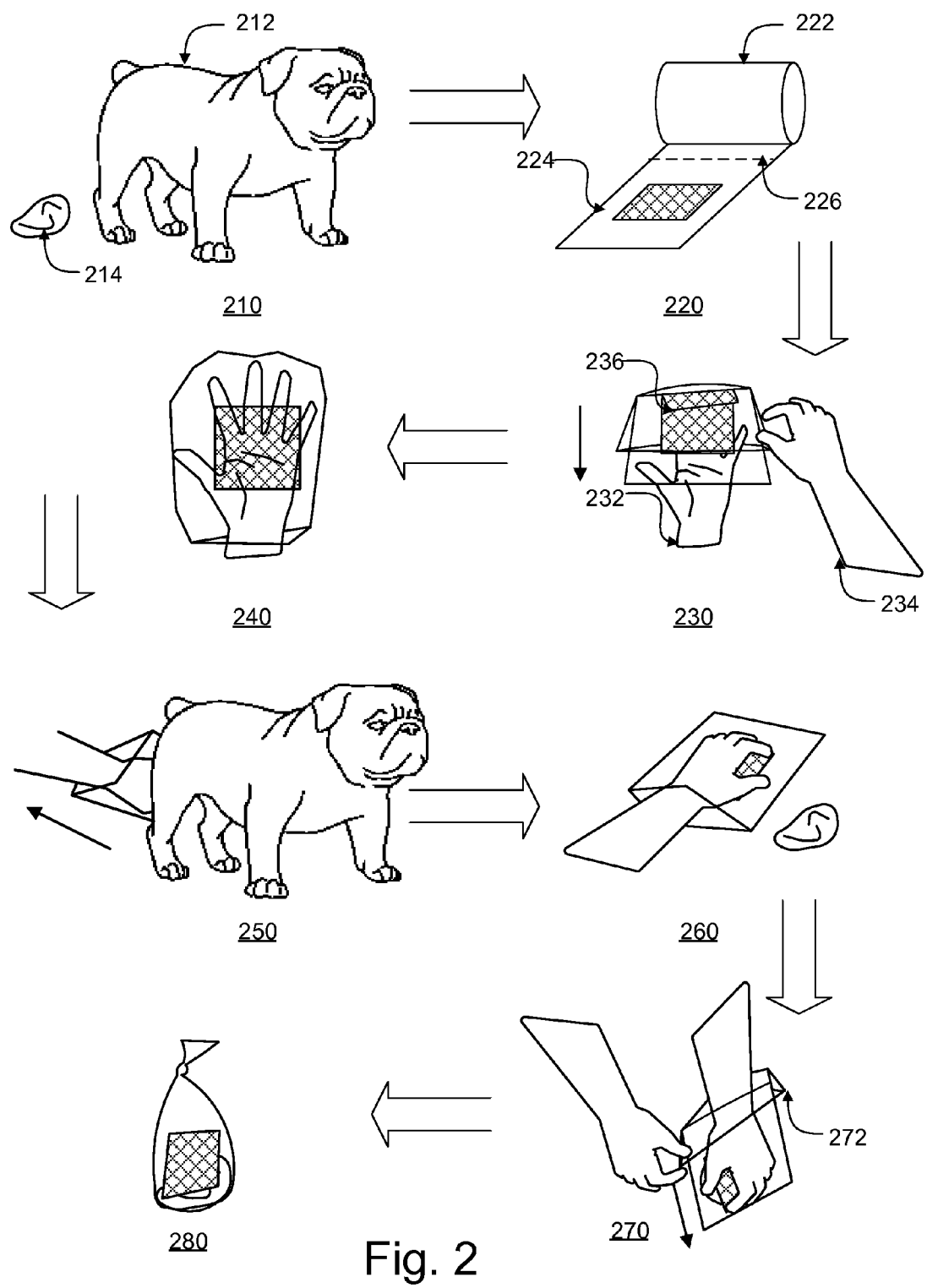
FIG. 2 illustrates exemplary method steps for utilizing a disposable pet wipe and waste collection bag.

Referring now to FIG. 2, exemplary method steps for utilizing a disposable pet wipe and waste collection bag 224 are illustrated. At 210, a pet 212 may leave collectable waste 214, wherein a pet owner may prefer or be compelled to dispose of the collectable waste. At 220, a disposable pet wipe and waste collection bag 224 may be separated from a roll 222 at a perforation point 226.

In some aspects, at 230, where the disposable pet wipe and waste collection bag 224 may be stored in a reversed position, a user may use her opposite hand 234 to reverse the disposable pet wipe and waste collection bag 224 onto her wiping hand 232, which may expose the moistened wipe 236. In other embodiments, such as illustrated in FIG. 1B, the disposable pet wipe and waste collection bag 224 may be stored in a normal position, wherein a user may separate an open end of the disposable pet wipe and waste collection bag 224, and slip the wiping hand 232 into the bag, wherein reversal of the disposable pet wipe and waste collection bag 224 over the wiping hand 232 may not be necessary. In some such aspects, an additional step may be necessary to expose the moistened wipe 236 for use. At 240, the disposable pet wipe and waste collection bag 224 may be sufficiently open to cover the wiping hand 232 and place the moistened wipe 236 in a convenient position for use.

At 250, a user may wipe the pet 212 with the moistened wipe 236 on the disposable pet wipe and waste collection bag 224 utilizing the wiping hand 232. At 260, the user may collect the collectable waste 214 using the disposable pet wipe and waste collection bag 224. At 270, the wiping hand 232 may continue to grip the collectable waste 214, as the opposite hand 234 may pull the open end 272 of the disposable pet wipe and waste collection bag 224 over the collectable waste 214. At 280, the user may tie the disposable pet wipe and waste collection bag 224, wherein the collectable waste 214 and soiled moistened wipe may be sanitarily contained within the disposable pet wipe and waste collection bag 224, while keeping users hands 232, 234 clean throughout the process.

Figure 3:
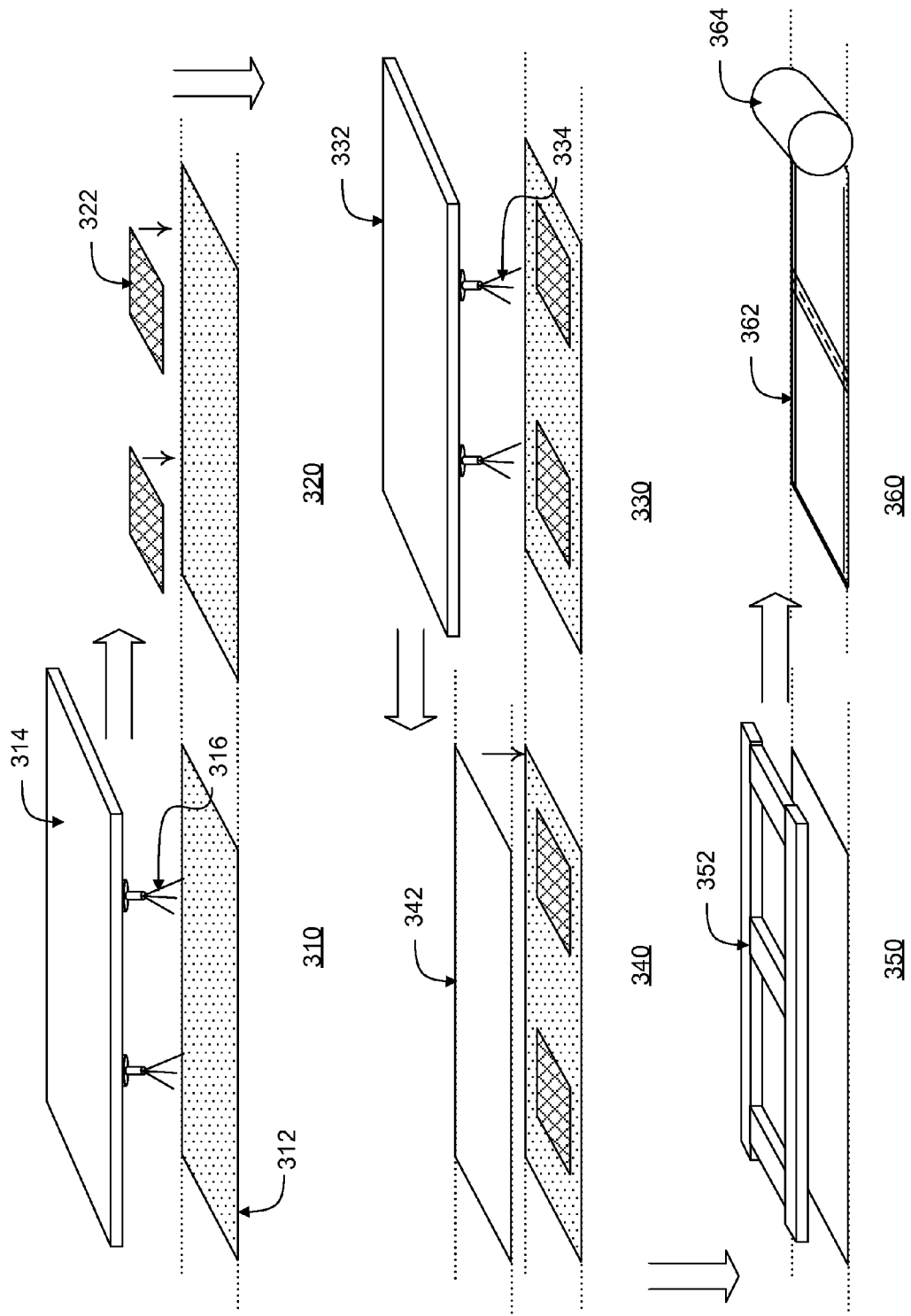
FIG. 3 illustrates exemplary method steps for manufacturing disposable pet wipe and waste collection bags.

Referring now to FIG. 3, exemplary method steps for manufacturing disposable pet wipe and waste collection bags 362 are illustrated. At 310, adhesive agents 316 may be applied to a first sheet 312. In some embodiments, the adhesive agents 316 may be applied by an adhesive applicator 314, such as a spray, paint, or pouring mechanism. In some aspects, the first sheet 312 may be chemically treated with an adhesion promoter, such as through a gas bath.

At 320, wipe material 322 may be placed proximate to the first sheet 312. In some embodiments, the layers 322, 312 may be pressed together by passing the film through a roller or compressor. Pressure may be applied, which may ensure contact between the wipe material 322, adhesive agent 316, and first sheet 312. The step at 320 may be repeated or duplicated at appropriate intervals in order to place one wipe material 322 smoothly adhered to the first sheet 312. This solution may comprise but may not be limited to cleansing agents, antimicrobial agents, moisturizing agents, etc. In some aspects, the solution may comprise an active agent, wherein the active agent may neutralize and/or degrade pet waste. The solution may sufficiently saturate the wipe, wherein the saturation may allow the majority or entirety of the wet wipe to be useful to the end consumer.

At 330, the wipe material 322 may be moistened with a sanitizing solution 334, such as through a solution applicator 332. In some embodiments, the step at 330 may occur separately, wherein the wipe material may be pre-moistened. At 340, a second sheet 342 may be placed proximate to the first sheet 312, wherein the second sheet 342 may cover the wipe material 322. At 350, a sealing mechanism 352 may seal portions of contact between the first sheet 312 and the second sheet 342, wherein the sealing may create a series of disposable pet wipe and waste collection bags 362 comprising at least one sealed end along the borders and an unsealed end at one border. There may be a perforation after each heat sealed line on the film, thus as the end user tears the film at the perforation a single disposable pet wipe and waste collection bag 362 with one open end and three closed sides is produced. In some embodiments, the first sheet 312 may comprise the same size as the second sheet 342. Alternatively, the first sheet 312 may be smaller or larger than the second sheet 342.

In some embodiments, the wipe material 322 may be adhered to the first sheet 312 through a heat sealing or thermoforming process. In some aspects, the wipe material 322 may be pre-moistened, and the steps at 310, 320, and 330 may be substituted with a heat sealing process, wherein a heat or chemical treatment may secure the pre-moistened wipe material 322 directly to the first sheet 312.

At 360, the series of disposable pet wipe and waste collection bag 362 may be rolled. This flattened product may now pass through a series of rollers 364 and/or folding apparatus, which may fold the product one to multiple times. After folding the bag roll the appropriate amount of times, the bag may be rolled into a tight roll, thus making a compact bag-on-roll end product, which may allow the end user to carry multiple disposable pet wipe and waste collection bag 362.

Figure 4:
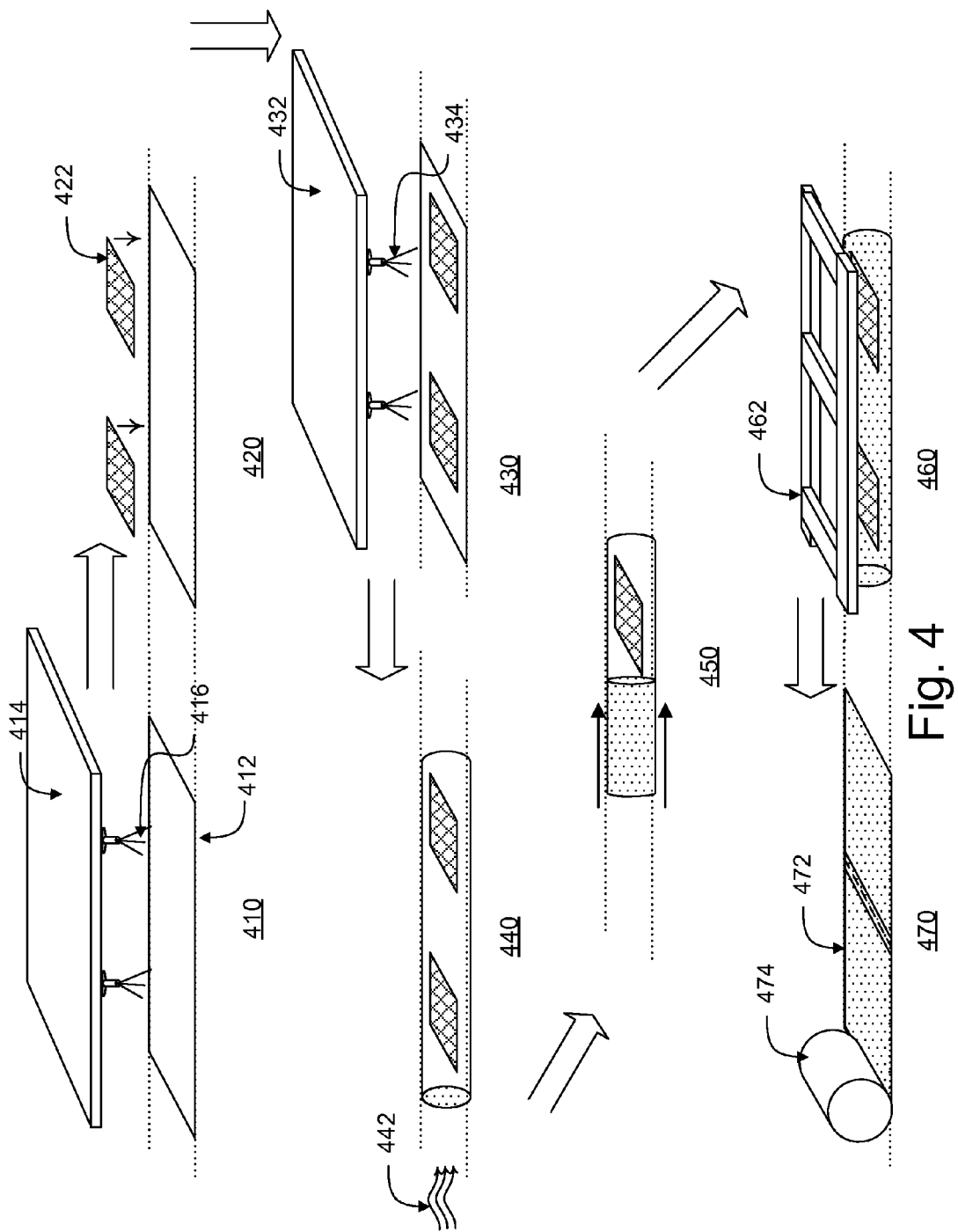
FIG. 4 illustrates alternate exemplary method steps for manufacturing disposable pet wipe and waste collection bags.

Referring now to FIG. 4, alternate exemplary method steps for manufacturing disposable pet wipe and waste collection bags 462 are illustrated. In some embodiments, a tubular film may be used, wherein combining and first sheet with a second sheet may not be necessary to create a pocket for the disposable pet wipe and waste collection bag. At 410, adhesive agents 416 may be applied to a tubular film 412. In some embodiments, the adhesive agents 416 may be applied by an adhesive applicator 414, such as a spray, paint, or pouring mechanism. In some aspects, the first sheet 412 may be chemically treated with an adhesion promoter, such as through a gas bath.

At 420, wipe material 422 may be placed proximate to the tubular film 412. At 430, the wipe material 422 may be moistened with a sanitizing solution 434, such as through a solution applicator 432. In some embodiments, the step at 430 may occur separately, wherein the wipe material may be pre-moistened.

At 440, airflow 442 may be applied to the tubular film 412, wherein the airflow 442 may separate the tubular film 412. At 450, the tubular film 412 may be reversed, which may allow the disposable pet wipe and waste collection bag 472 to be rolled in a reversed position. At 460, a sealing and perforating mechanism 462 may create separate pockets, wherein each pocket may comprise a wipe material. At 470, a series of sealed and perforated disposable pet wipe and waste collection bag 472 may be rolled.

CONCLUSION

A number of embodiments of the present disclosure have been described. While this specification contains many specific implementation details, they should not be construed as limitations on the scope of any disclosures or of what may be claimed, but rather as descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure. Further, Any discussion of the prior art should in no way be considered as an admission.

What is claimed is:

1. A series of disposable pet wipe and waste collection bags comprising:
    a plurality of disposable pet wipe waste collection bags, wherein the plurality of disposable pet wipe waste collection bags are detachably interconnected, each disposable pet wipe waste collection bag comprises:
    a disposable reversible receptacle comprising:
        an exterior comprising a first surface of a pliable material of limited moisture permeability, wherein at least a portion of the first surface of the pliable material comprises a moistened wipe, wherein the moistened wipe comprises an at least partially absorptive material moistened with a wipe solution;
        an interior configured to fit over a hand of a user, wherein the interior and the exterior share the pliable material and the interior comprises a second surface of the pliable material, wherein the interior is exposed when the disposable reversible receptacle is interconnected within the series;
        an unsealed end, wherein the detachable interconnection closes the unsealed end when the disposable reversible receptacle is attached in the series; and
        a sealed end distally located from the unsealed end;
        a first sealed edge perpendicular to the unsealed end and the sealed end;
        a second sealed edge distally located from the first sealed edge, wherein the second sealed edge is perpendicular to the unsealed end and the sealed end;
    wherein the sealed end of a plurality of disposable pet wipe collection bags are detachably interconnected to the unsealed end of an adjacent disposable pet wipe collection bag and limits loss of moisture from the moistened wipe while the disposable pet wipe collection bag is interconnected with the series, and wherein detaching a selected disposable pet wipe collection bag from an adjacent disposable pet wipe collection bag separates the unsealed end of the detached disposable pet wipe collection bag, allowing access to the exterior.

2. The series of disposable pet wipe and waste collection bag of claim 1, wherein the plurality of disposable pet wipe and waste collection bags are detachably interconnected as a roll.

3. The series of disposable pet wipe and waste collection bag of claim 1, wherein the plurality of disposable pet wipe and waste collection bags are detachably interconnected as a stack.

4. The series of disposable pet wipe and waste collection bags of claim 1, wherein the pliable material comprises a plastic.

5. The series of disposable pet wipe and waste collection bags of claim 1, wherein the pliable material comprises a tubular film, wherein the series of disposable pet wipe and waste collection bags is manufactured from the tubular film.

6. The series of disposable pet wipe and waste collection bags of claim 1, wherein the disposable reversible receptacle of each disposable pet wipe and waste collection bag comprises a plurality of plastic sheets connected by a sealing process.

7. The series of disposable pet wipe and waste collection bags of claim 1, wherein the wipe solution comprises an antibacterial solution.

8. The series of disposable pet wipe and waste collection bags of claim 1, wherein the partially absorptive material comprises a spun lace nonwoven fabric.

9. The series of disposable pet wipe and waste collection bags of claim 1, wherein one or both the partially absorptive material or the pliable material comprises a biodegradable material.

10. The series of disposable pet wipe and waste collection bags of claim 1, wherein the partially absorptive material is further moistened with a reactive agent capable of one or both neutralizing odor or degrading pet waste.

11. The series of disposable pet wipe and waste collection bags of claim 1, wherein the second surface comprises a textured surface.

12. The series of disposable pet wipe and waste collection bags of claim 1, wherein the moistened wipe is adhered to the first surface.

13. The series of disposable pet wipe and waste collection bags of claim 1, wherein the moistened wipe is integrated into the first surface.

14. The series of disposable pet wipe and waste collection bags of claim 1, wherein the wipe solution comprises a soothing component.

15. The series of disposable pet wipe and waste collection bags of claim 1, wherein the partially absorptive material comprises a textured surface.

\* \* \* \* \*